United States Patent [19]

Calundann

[11] 4,161,470

[45] Jul. 17, 1979

[54] POLYESTER OF 6-HYDROXY-2-NAPHTHOIC ACID AND PARA-HYDROXY BENZOIC ACID CAPABLE OF READILY UNDERGOING MELT PROCESSING

[75] Inventor: Gordon W. Calundann, North Plainfield, N.J.

[73] Assignee: Celanese Corporation, New York, N.Y.

[21] Appl. No.: 843,993

[22] Filed: Oct. 20, 1977

[51] Int. Cl.$^2$ ............................................. C08G 63/06
[52] U.S. Cl. ................................. 260/40 P; 260/40 R; 528/190; 528/206
[58] Field of Search .................. 260/47 C, 40 P, 40 R; 528/206, 190

[56] References Cited

U.S. PATENT DOCUMENTS

| | | | |
|---|---|---|---|
| 4,067,852 | 1/1978 | Calundann et al. | 528/190 |
| 4,083,829 | 4/1978 | Calundann et al. | 528/190 |
| 4,118,372 | 10/1978 | Schaefgen | 528/190 |

Primary Examiner—Lester L. Lee
Attorney, Agent, or Firm—Kenneth A. Genoni

[57] ABSTRACT

A novel polyester is provided which has been found to exhibit a thermotropic melt phase at a temperature which enables it readily to undergo melt processing to form quality fibers, molded articles, etc. The polyester of the present invention is formed primarily of recurring 6-oxy-2-naphthoyl and p-oxybenzoyl moieties in the proportions indicated. The hydrogen atoms present upon the aromatic rings of these moieties optionally may be at least partially substituted (as described). Also, minor amounts of other ester-forming moieties may be included in the polyester so long as the thermotropic character and ease of melt processability is retained. In a preferred embodiment the wholly aromatic polyester is capable of undergoing melt processing at a temperature below approximately 325° C., and in a particularly preferred embodiment at a temperature of approximately 280° to 300° C.

42 Claims, No Drawings

POLYESTER OF 6-HYDROXY-2-NAPHTHOIC ACID AND PARA-HYDROXY BENZOIC ACID CAPABLE OF READILY UNDERGOING MELT PROCESSING

BACKGROUND OF THE INVENTION

Wholly aromatic polyester resins have long been known. For instance, p-hydroxybenzoic acid homopolymer and copolymers have been provided in the past and are commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc. commonly have not been viable alternatives or when attempted commonly have been accomplished with difficulty. Such polymers commonly cannot be melt extruded to form nondegraded fibers. Even those wholly aromatic polymers which exhibit a melting point below their decomposition temperature commonly melt at such high temperatures that quality fibers may not be melt spun. For instance, fibers melt extruded at extremely high temperatures commonly possess a voidy internal structure and diminished tensile properties.

Representative publications which discuss wholly aromatic polyesters include: (a) *Polyesters of Hydroxybenzoic Acids,* by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols),* by G. Bier, Polymer, Vol. 15, Pages 527 to 535 (August 1974), (c) *Aromatic Polyester Plastics,* by S. G. Cottis, Modern Plastics, Pages 62 to 63 (July 1975), and (d) *Poly (p-Oxybenzoyl Systems): Homopolymer for Coatings: Copolymers for Compression and Injection Molding,* by Roger S. Storm and Steve G. Cottis, Coatings Plast. Preprint, Vol 34, No. 1, pages 194 to 197 (April 1974). See also, U.S. Pat. Nos. 3,039,994; 3,169,121; 3,321,437; 3,553,167; 3,637,595; 3,651,014; 3,723,388; 3,759,870; 3,767,621; 3,787,370; 3,790,528; 3,829,406; 3,890,256; and 3,975,487.

Also, it more recently has been disclosed that certain polyesters may be formed which exhibit melt anistropy. See for instance, (a) *Polyester X7G-A Self Reinforced Thermoplastic,* by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch No. 7505551, (d) West German Pat. Nos. 2520819 and 2520820, (e) Japanese No. 43-233, (f) U.S. Pat. Nos. 3,991,013 and 3,991,014.

In commonly assigned U.S. Ser. No. 686,189, filed May 13, 1976 (now U.S. Pat. No. 4,067,852), by Gordon W. Calundann entitled "Improved Melt Processable Thermotropic Wholly Aromatic Polyester and Process for Its Production" is claimed a generic invention wherein a wholly aromatic polyester (as defined) consists essentially of recurring units of p-oxybenzoyl moiety, 2,6-dicarboxynaphthalene moiety, and symmetrical dioxy aryl moiety.

In commonly assigned U.S. Ser. No. 789,374, filed Apr. 20, 1977 (now U.S. Pat. No. 4,083,829) by Gordon W. Calundann, Herbert L. Davis, Frederick J. Gorman, and Robert M. Mininni, entitled "Improved Melt Processable Thermotropic Wholly Aromatic Polyester Which Is Particularly Suited for Fiber Formation" is specifically claimed a species of the generic invention defined in U.S. Ser. No. 686,189 wherein an isophthaloyl moiety and/or metadioxy phenyl moiety recur in the wholly aromatic polyester in addition to p-oxybenzoyl moiety, 2,6-dicarboxynaphthalene moiety, and symmetrical dioxy aryl moiety.

In commonly assigned U.S. Ser. No. 832,147 filed Sept. 12, 1977, now abandoned by Gordon W. Calundann, entitled "Melt Processable Thermotropic Wholly Aromatic Polyester" is claimed a wholly aromatic polyester (as defined) which consists essentially of recurring units of p-oxybenzoyl moiety, 2,6-dioxynaphthalene moiety, and terephthaloyl moiety.

In commonly assigned U.S. Ser. No. 832,713 filed Sept. 12, 1977 by Gordon W. Calundann, entitled "Melt Processable Thermotropic Wholly Aromatic Polyester Comprising Both Para-Oxybenzoyl and Meta-Oxybenzoyl Moieties" is claimed a wholly aromatic polyester (as defined) which consists essentially of recurring units of p-oxybenzoyl moiety, m-oxybenzoyl moiety, 2,6-dicarboxynaphthalene moiety, and symmetrical dioxy aryl moiety.

It is an object of the present invention to provide an improved melt processable wholly aromatic polyester.

It is an object of the present invention to provide an improved wholly aromatic polyester which is suited for the formation with ease of quality molded articles, melt extruded fibers, and melt extruded films.

It is an object of the present invention to provide an improved melt processable wholly aromatic polyester capable of forming a thermotropic melt phase at a temperature below approximately 350° C., preferably below 325° C., and most preferably below approximately 300° C.

It is an object of the present invention to provide an improved wholly aromatic polyester which forms a highly tractable melt phase.

It is an object of the present invention to provide an improved wholly aromatic polyester which satisfactorily can be formed without precise regard to the stoichiometric proportions of reactants.

It is an object of the present invention to provide an improved wholly aromatic polyester which forms a thermotropic melt phase at a temperature well below its decomposition temperature and which may form quality high performance fibers.

It is an object of the present invention to provide improved wholly aromatic polyester fibers which particularly are suited for use as fibrous reinforcement in a rubber matrix.

It is another object of the present invention to provide an improved wholly aromatic polyester which readily may be melt extruded to form a film.

It is another object of the present invention to provide an improved wholly aromatic polyester which readily may be injection molded to form a molded article (which optionally may be fiber reinforced) exhibiting superior tensile strength, flex strength, and impact strength.

These and other objects, as well as the scope, nature and utilization of the invention will be apparent to those skilled in the art from the following detailed description.

SUMMARY OF THE INVENTION

It has been found that a melt processable wholly aromatic polyester capable of forming a thermotropic melt phase at a temperature below approximately 350° C. consists essentially of the recurring moieties I and II which may include substitution of at least some of the hydrogen atoms present upon an aromatic ring where:

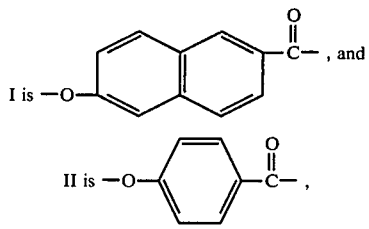

with said optional substitution if present being selected from the group consisting of an alkyl group of 1 to 4 carbon atoms, an alkoxy group of 1 to 4 carbon atoms, halogen, and mixtures of the foregoing, and wherein said polyester comprises approximately 10 to 90 mole percent of moiety I, and approximately 10 to 90 mole percent of moiety II.

DESCRIPTION OF PREFERRED EMBODIMENTS

The wholly aromatic polyester of the present invention consists essentially of at least two recurring moieties which when combined in the polyester have been found to form an atypical thermotropic melt phase at a temperature below approximately 350° C., preferably below approximately 325° C., and most preferably below approximately 300° C. (e.g. at approximately 280° to 300° C.). Such aromatic polyester in most but not all embodiments of the present invention is crystalline in nature. The polymer melting temperatures may be confirmed by the use of a differential scanning calorimeter (i.e. DSC) employing repeat scans at a 20° C. per minute heat-up rate and observing the peak of the DSC melt transition. The crystalline polyester commonly exhibits a melting point of at least 250° C. and preferably of at least 275° C. as determined by differential scanning calorimetry. Because of its ability to exhibit anisotropic properties (i.e., liquid crystals) in the melt, the polyester readily can form a product having a highly oriented molecular structure upon melt processing. Preferred polyesters are capable of undergoing melt processing at a temperature in the range of approximately 280° to 300° C. The usual difficulties incurred when one attempts to melt process aromatic polyesters by conventional melt processing techniques effectively are eliminated. The aromatic polyester is considered to be "wholly" aromatic in the sense that each moiety present in the same contributes at least one aromatic ring to the polymer backbone.

The wholly aromatic polyester comprises two essential moieties. Moiety I can be termed a 6-oxy-2-naphthoyl moiety and possesses the structural formula:

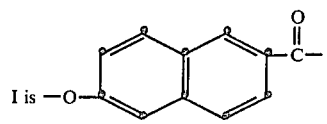

While not specifically illustrated in the structural formula, at least some of the hydrogen atoms present upon the aromatic rings of moiety I may be substituted. Such optional substitution may be an alkyl group of 1 to 4 carbon atoms, an alkoxy group of 1 to 4 carbon atoms, halogen (e.g. Cl, Br, I), and mixtures of the foregoing. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-7-chloro-2-naphthoic acid, 6-hydroxy-4,7-dichloro-2-naphthoic acid, etc. The presence of ring substitution tends to modify to some degree the physical properties of the resulting polymer (e.g. the polymer may soften at a lower temperature, its impact strength may be improved, and the crystallinity of the solid polymer may be decreased). In a preferred embodiment wherein a polyester of optimum crystallinity in the solid state is desired, no ring substitution is present.

As will be apparent to those skilled in the art, moiety I can be derived from unsubstituted 6-hydroxy-2-naphthoic acid and the derivatives thereof. A convenient laboratory preparation for forming 6-hydroxy-2-naphthoic acid is described in Berichte, Vol. 58, 2835–45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol.

Moiety I comprises approximately 10 to 90 mole percent of the wholly aromatic polyester. In a preferred embodiment moiety I is present in a concentration of approximately 15 to 35 mole percent, and most preferably in a concentration of approximately 20 to 30 mole percent, e.g. approximately 25 mole percent. In another preferred embodiment moiety I is present in a concentration of approximately 65 to 85 mole percent and most preferably in a concentration of approximately 70 to 80 mole percent. The wholly aromatic polyester tends to form the desired thermotropic melt at an optimum temperature from a fiber/resin properties viewpoint when one incorporates moiety I in the more preferred quantities. Since moiety I tends to be more costly to provide than moiety II, one will commonly select those embodiments wherein moiety I is present in a lesser proportion.

The second essential moiety (i.e. moiety II) can be termed a p-oxybenzoyl moiety and possesses the structural formula:

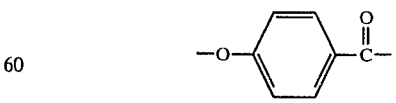

While not specifically illustrated in the structural formula, at least some of the hydrogen atoms present upon the aromatic ring of moiety II may be substituted. Such optional substitution may be an alkyl group of 1 to 4 carbon atoms, an alkoxy group of 1 to 4 carbon atoms, halogen (e.g. Cl, Br, I), and mixtures of the foregoing.

Representative examples of ring substituted compounds from which moiety II can be derived include 3-chloro-4-hydroxy benzoic acid, 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, etc. The presence of ring substitution in moiety II tends to modify to some degree the physical properties of the resulting polymer as previously described in connection with moiety I. In a preferred embodiment wherein a polyester of optimum crystallinity in the solid state is desired, no ring substitution is present. For instance, moiety II is then derived from unsubstituted p-hydroxy benzoic acid or its derivatives.

Moiety II comprises approximately 10 to 90 mole percent of the wholly aromatic polyester. In a preferred embodiment moiety II is present in a concentration of approximately 65 to 85 mole percent, and most preferably in a concentration of approximately 70 to 80 mole percent, e.g. approximately 75 mole percent. In another preferred embodiment wherein moiety I is the major component as indicated above, moiety II is present in a lesser proportion of approximately 15 to 35 mole percent, and most preferably in a concentration of approximately 20 to 30 mole percent. The wholly aromatic polyester tends to form the desired thermotropic melt at optimum temperature when one incorporates moiety II in the more preferred quantities. Since moiety II tends to be less expensive to provide than moiety I, one will commonly select those embodiments wherein moiety II is the major component.

Other aryl ester-forming moieties (e.g. dicarboxy units, dioxy units and/or other combined oxy and carboxy units) other than moieties I and II additionally may be included in the wholly aromatic polyester of the present invention in a minor concentration (e.g. up to about 10 mole percent) so long as such moieties do not adversely influence the desired thermotropic melt phase exhibited by the polyester heretofore defined and do not raise the melting point of the resulting polymer above that specified. As will be apparent to those skilled in the art, the total molar quantities of dicarboxy units and dioxy units present within the wholly aromatic polyester will be substantially equal. Additionally, a minor quantity of another moiety derived from an aromatic hydroxy acid such as meta-oxybenzoyl moiety which is derived from m-hydroxy benzoic acid optionally may be included in the wholly aromatic polyester together with moieties I and II. This component has the propensity to soften the polymer and reduce or eliminate high order crystallinity thus increasing the amorphous nature of the polymer. The various moieties upon polymer formation will tend to be present in a random configuration.

In a preferred embodiment the wholly aromatic polyester is formed solely of moieties I and II. Accordingly, the reactants are inherently stoichiometrically balanced thereby greatly simplifying polymer formation since the importance of precise reactant measurement is minimized, and the polymerization reaction will tend to proceed to a relatively high molecular weight, relatively uniform product without difficulty.

The wholly aromatic polyester of the present invention commonly exhibits

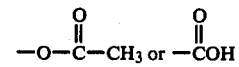

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

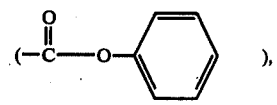

and methylester

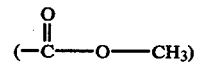

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluoroisopropanol and o-chlorophenol, and accordingly are not susceptible to solution processing. They can surprisingly be readily processed by common melt processing techniques as discussed hereafter. Most compositions are soluble in pentafluorophenol.

The wholly aromatic polyester of the present invention commonly exhibits a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infra red spectroscopy on compression molded films. Alternatively, light scattering techniques in a pentafluorophenol solution may be employed to determine the molecular weight.

The wholly aromatic polyester prior to heat treatment additionally commonly exhibits an inherent viscosity (i.e., I.V.) of at least approximately 2.5, and preferably at least approximately 3.5 (e.g., approximately 3.5 to 7.5) when dissolved in a concentration of 0.1 percent be weight in pentafluorophenol at 60° C.

The wholly aromatic polyesters of the present invention commonly may be considered crystalline in the sense that fibers melt extruded therefrom exhibit x-ray diffraction patterns using Ni-filtered CuKα radiation and flat plate cameras characteristic of polymeric crystalline materials. In those embodiments wherein aromatic ring substitution is present as previously described the polyesters may be substantially less crystalline in the solid phase and exhibit diffraction patterns typical of oriented amorphous fibers. In spite of the crystallinity commonly observed, the wholly aromatic polyester of the present invention nevertheless may be easily melt processed in all instances.

Unlike the aromatic polyesters commonly encountered in the prior art, the wholly aromatic polyester of the present invention is not intractable and forms a thermotropic melt phase whereby an atypical degree of order is manifest in the molten polymer. The subject polyester readily forms liquid crystals in the melt phase and accordingly exhibits a high tendency for the polymer chains to orient in the shear direction. Such thermotropic properties are manifest at a temperature which is amenable for melt processing to form shaped articles. Such anisotropy in the melt may be confirmed by conventional polarized light techniques whereby cross-polaroids are utilized. More specifically, the thermotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polaroids. The amount of light transmitted increases when the sample is sheared (i.e., is made to flow), however, the sample is optically anisotropic even in the static state.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants with the reaction continuing as solid polymer particles are suspended therein. A vacuum may be applied to facilitate removal of volatiles formed during the final stage of the condensation (e.g., acetic acid or water).

As set forth in commonly assigned U.S. Ser. No. 686,189, filed May 13, 1976 (now U.S. Pat. No. 4,067,852), of Gordon W. Calundann, entitled "Improved Melt Processable Thermotropic Wholly Aromatic Polyester and Process for Its Production" is described another slurry polymerization process which may be employed to form the wholly aromatic polyester of the present invention wherein the solid product is suspended in a heat exchange medium. The disclosure of this copending application is herein incorporated by reference.

When employing either the melt acidolysis procedure or the slurry prodecure of Ser. No. 686,189 the organic monomer reactants from which the 6-oxy-2-naphthoyl moiety (i.e., moiety I) and the p-oxybenzoyl moiety (i.e., moiety II) are derived may be initially provided in a modified form whereby the usual hydroxyl groups of these monomers are esterified (i.e., they are provided as acyl esters). For instance, lower acyl esters of 6-hydroxy-2-naphthoic acid and p-hydroxy benzoic acid wherein the hydroxy groups are esterified may be provided as reactants. The lower acyl groups preferably have from about 2 to about 4 carbon atoms. Preferably the acetate esters of the organic compounds which form moieties I and II are provided. Accordingly, particularly preferred reactants for the condensation reaction are 6-acetoxy-2-naphthoic acid and p-acetoxybenzoic acid. If minor quantities of other aryl reactants (as previously discussed) optionally provide oxy-units within the resulting polymer, these too preferably are provided as the corresponding lower acyl esters.

Representative catalysts which optionally may be employed in either the melt hydrolysis procedure or in the procedure of Ser. No. 686,189 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed wholly aromatic polyester may be further increased via a solid state polymerization procedure wherein the particulate polymer is heated in an inert atmosphere (e.g. in a nitrogen atmosphere at a temperature of about 260° C. for 10 to 12 hours).

The wholly aromatic polyester of the present invention readily can be melt processed to form a variety of shaped articles, e.g., molded three-dimensional articles, fibers, films, tapes, etc. The polyester of the present invention is suited for molding applications and may be molded via standard injection molding techniques commonly utilized when forming molded articles. Unlike the wholly aromatic polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the wholly aromatic polyester of the present invention which incorporates approximately 1 to 60 percent by weight of a solid filler (e.g. talc) and/or reinforcing agent (e.g. glass fibers).

The wholly aromatic polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e. a slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed. The melt-spinnable wholly aromatic polyester is supplied to the extrusion orifice at a temperature above its melting point, e.g., a temperature of about 280° to 320° C.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material or film optionally may be subjected to a thermal treatment whereby its physical properties are further enhanced. The tenacity of the fiber or film generally is increased by such thermal treatment. More specifically, the fibers or films may be thermally treated in an inert atmosphere (e.g., nitrogen, argon, helium or steam) or in a flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Alternatively, the fiber may be heated at about 15° to 20° C. below the temperature at which it melts for about 48 hours. Optimum heat treatment conditions will vary with the specific composition of the wholly aromatic polyester and with the fiber's process history.

The as-spun fibers formed from the wholly aromatic polyester of the present invention are fully oriented and exhibit highly satisfactory physical properties which render them suitable for use in high performance applications. The as-spun fibers commonly exhibit an average single filament tenacity of at least 5 grams per denier (e.g., about 5 to 15 grams per denier), and average single filament tensile modulus of at least about 300 grams per denier (e.g., about 300 to 1000 grams per denier), and exhibit an extraordinary dimensional stability at elevated temperature (e.g., at temperatures of about 150° to 200° C.).

Following thermal treatment (i.e., annealing) the fibers commonly exhibit an average single filament tenacity of at least 10 grams per denier (e.g., 10 to 30 grams per denier), and an average single filament tensile modulus of at least 300 grams per denier measured at ambient conditions (e.g., 72° F. and 65 percent relative humidity). Such properties enable the fibers to be used with particular advantage as tire cords and in other industrial applications, such as conveyor belts, hose, cabling, resin reinforcement, etc. Films formed of the wholly aromatic polyester of the present invention may be used as strapping tape, cable wrap, magnetic tape, electric motor dielectric film, etc. The fibers and films exhibit an inherent resistance to burning.

The following examples are presented as specific illustrations of the claimed invention. It should be understood, however, that the invention is not limited to the specific details set forth in the examples.

EXAMPLE I

To a three-neck, round flask equipped with a stirrer, argon inlet tube, and a heating tape wrapped distillation head connected to a condenser were added the following:
(a) 67.5 grams p-acetoxybenzoic acid (0.375 mole), and
(b) 28.7 grams 6-acetoxy-2-naphthoic acid (0.125 mole).

The charged flask was vacuum purged with argon three times and brought to a temperature of 250° C. At 250° C. the clear, slightly tinted reaction solution was stirred rapidly under a slow stream of dry argon while acetic acid was distilled from the polymerization vessel. The reaction melt turned opaque with suspended polymer after approximately 9 ml. of acetic acid were collected. The polymerization mixture was stirred for 3 hours at 250° C., and then for 1 hour and 15 minutes at 280° C. About 24 ml. of acetic acid were collected during these stages. The polymerization temperature was next increased to 320° C. The viscous polymer melt was held for 25 minutes at 320° C. under an argon flow and then subjected to a series of reduced pressure stages. The argon flow was halted and the pressure above the stirred polymer melt was reduced to and held at 240 mm. of mercury for about 5 minutes. Over the next 9 minutes the pressure was reduced in stages to about 0.1 to 0.2 mm. of mercury and maintained at this pressure level for about 26 minutes. During these stages the polymer melt continued to increase in viscosity and was stirred more slowly while the remaining acetic acid was removed from the reaction vessel. Upon cooling (i.e., to about 25° C.) the polymer plug was finely ground and dried in a forced air oven at 150° C. for 50 to 60 minutes.

The resulting wholly aromatic polyester (about 65 grams) had an inherent viscosity (I.V.) of 5.7 as determined in a pentafluorophenol solution of 0.1 percent be weight concentration at 60° C.

$$I.V. = \ln(\eta \text{ rel})/c$$

where c=concentration of solution (0.1 percent by weight), and rel=relative viscosity. The relative viscosity was measured by dividing the flow time in a capillary viscometer of the polymer solution by the flow time for the pure solvent.

When the polymer was subjected to differential scanning calorimetry (DSC), it exhibited a sharp melt endotherm at about 302° C. (peak), which repeated at about 302° C. on subsequent remelt scans. The polymer melt was thermotropic. When the melt was cooled in the differential scanning calorimeter at a rate $-20°$ C./min., a sharp polymer crystallization exotherm was observed at about 270° C. (peak).

The polymer was melt extruded into a continuous filament of about 15 denier per filament.

More specifically, the polymer melt while at a temperature of about 310° C. was extruded through a spinneret provided with a single hole jet having a diameter of 20 mils and a length of 100 mils. The extruded filament was quenched in ambient air (i.e. at 72° F. and 65 percent relative humidity). The as-spun filament was taken up at a rate of 150 meters per minute.

The resulting as-spun wholly aromatic polyester fiber exhibited the following average single filament properties:
Tenacity (grams per denier):12.1
Tensile modulus (grams per denier):541
Elongation (percent):2.80

Following thermal treatment in a dry nitrogen flow at 250° C. for 90 hours, the fiber exhibited the following average single filament properties:
Tenacity (grams per denier:20
Tensile modulus (grams per denier):550
Elongation (percent):5

The fiber also exhibited a low degree of shrinkage at elevated temperatures and a good retention of tenacity and tensile modulus values at temperatures up to about 150° to 200° C.

EXAMPLE II

Example I was substantially repeated with the exception that the following ingredients were charged to the flask:
(a) 101 grams of p-acetoxybenzoic acid (0.56 mole), and (b) 55 grams of 6-acetoxy-2-naphthoic acid (0.24 mole).

The resulting wholly aromatic polyester had an I.V. of 4.3 as determined in pentafluorophenol. When the polymer was subjected to differential scanning calorimetry (DSC), it exhibited a sharp melt endotherm at about 275° C. (peak), which repeated at about 275° C. on subsequent remelt scans. The polymer melt was thermotropic.

Following melt extrusion the resulting as-spun wholly aromatic polyester fiber exhibited a denier per filament of 26 and the following average single filament properties:

Tenacity (grams per denier:9.1
Tensile modulus (grams per denier):490
Elongation (percent):2.5

Following thermal treatment in a dry nitrogen flow at 250° C. for 40 hours, the fiber exhibited the following average single filament properties:

Tenacity (grams per denier):14
Tensile modulus (grams per denier:485
Elongation (percent):3.0

A ground sample of this polymer was solid state polymerized further by placing it in a flow of dry nitrogen at 250° C. for about 50 hours and then subjecting it to the fiber-forming process. This polymer was insoluble in pentafluorophenol at 90° C., and upon subjection to differential scanning calorimetry (DSC) exhibited a sharp melt endotherm at about 290° C. (peak), which repeated at about 275° C. on subsequent remelt scans. The polymer melt was thermotropic.

Following melt extrusion of the solid state polymerized polymer the resulting as-spun wholly aromatic polyester fiber exhibited a denier per filament of 11 and the following average single filament properties:

Tenacity (grams per denier):12.4
Tensile modulus (grams per denier):622
Elongation (percent):2.62

Following thermal treatment in a dry nitrogen flow at 250° C. for 90 hours, the fiber exhibited the following average single filament properties:

Tenacity (grams per denier): 16
Tensile modulus (grams per denier): 530
Elongation (percent): 3.5

Both fibers also exhibited a low degree of shrinkage at elevated temperatures and a good retention of tenacity and tensile modulus values at temperatures up to about 150° to 200° C.

EXAMPLE III

Example I was substantially repeated with the exception that the following ingredients were charged to the flask:

54 grams of a p-acetoxybenzoic acid (0.3 mole), and
46 grams of 6-acetoxy-2-nahthoic acid (0.2 mole).

The resulting wholly aromatic polyester had an I.V. of 3.0 as determined in pentaflorophenol. When the polymer was subjected to differential scanning calorimetry (DSC), it exhibited a sharp melt endotherm at about 245° C. (peak), which repeated at about 245° C. on subsequent remelt scans. The polymer melt was thermotropic.

Following melt extrusion the resulting as-spun wholly aromatic polymer fiber exhibited a denier per filament of 4 and the following average single filament properties:

Tenacity (grams per denier): 9.2
Tensile modulus (grams per denier): 597
Elongation (percent): 2.2

The fiber also exhibited a low degree of shrinkage at elevated temperatures and a good retention of tenacity and tensile modulus values at temperatures up to about 150° to 200° C.

EXAMPLE IV

Example I was substantially repeated with the exception that the following ingredients were charged to the flask:

45.0 grams of p-acetoxybenzoic acid (0.25 mole), and
57.5 grams 6-acetoxy-2-naphthoic acid (0.25 mole), The resulting wholly aromatic polyester had an I.V. of 3.5 as determined in pentafluorophenol. When the polymer was subjected to differential scanning calorimetry (DSC), it exhibited a sharp melt endotherm at about 260° C. (peak), which repeated at about 260° C. on subsequent remelt scans. The polymer melt was thermotropic.

Following melt extrusion the resulting as-spun wholly aromatic polyester fiber exhibited a denier per filament of 15 and the following average single filament properties:

Tenacity (grams per denier): 10.1
Tensile modulus (grams per denier): 513
Elongation (percent): 2.6

Following thermal treatment in a dry nitrogen flow at 250° C. for 90 hours, the fiber exhibited the following average single filament properties:

Tenacity (grams per denier: 15.6
Tensile modulus (grams per denier): 500
Elongation (percent): 4.0

The fiber also exhibited a low degree of shrinkage at elevated temperatures and a good retention of tenacity and tensile modulus values at temperatures up to about 150° to 200° C.

EXAMPLE V

Example I was substantially repeated with the exception that the following ingredients were charged to the flask;

36 grams of p-acetoxybenzoic acid (0.2 mole), and
69 grams 6-acetoxy-2-naphthoic acid (0.3 mole).

The resulting wholly aromatic polyester has an I.V. of 2.8 as determined in pentafluorophenol. When the polymer was subjected to differential scanning calorimetry (DSC), it exhibited a sharp melt endotherm at about 263° C. (peak), which repeated at about 263° C. on subsequent remelt scans. The polymer melt was thermotropic.

Following melt extrusion the resulting as-spun wholly aromatic polyester fiber exhibited a denier per filament of 2 and the following average single filament properties:

Tenacity (grams per denier): 7.2
Tensile modulus (grams per denier): 742
Elongation (percent): 1.3

EXAMPLE VI

Example I was substantially repeated with the exception that the following ingredients were charged to the flask:

64.8 grams p-acetoxybenzoic acid (0.36 mole),
25.7 grams 3-chloro-4-acetoxybenzoic acid (0.12 mole), and
27.6 grams 6-acetoxy-2-maphthoic acid (0.12 mole).

The resulting wholly aromatic polyester had an I.V. of 3.2 as determined in pentafluorophenol. When the polymer was subjected to differential scanning calorimetry (DSC), it exhibited substantially no crystalline melt transition peak. X-ray analysis suggested that the polymer as prepared was amorphous, although the polymer melt was thermotropic.

Following melt extrusion the resulting as-spun wholly aromatic polyester fiber exhibited a filament denier of 6 and the following average single filament properties:

Tenacity (grams per denier): 10.2
Tensile modulus (grams per denier): 569
Elongation (percent): 2.4

EXAMPLE VII

Example I was substantially repeated with the exception that the following ingredients were charged to the flask:

45.0 grams of p-acetoxybenzoic acid (0.25 mole),
21.5 grams of 3-chloro-4-acetoxybenzoic acid (0.10 mole), and
34.5 grams of 6-acetoxy-2-naphthoic acid (0.15 mole).

The resulting wholly aromatic polyester had an I.V. of 6.9 as determined in pentafluorophenol. When the polymer was subjected to differential scanning calorimetry (DSC), it exhibited substantially no crystalline melt transition peak. X-ray analysis suggested that the polymer as prepared was amorphous or non-crystalline, although the polymer melt was thermotropic.

Following melt extrusion the resulting as-spun wholly aromatic polyester fiber exhibited a denier per filament of 7 and the following average single filament properties:

Tenacity (grams per denier): 12.1
Tensile modulus (grams per denier): 620
Elongation (percent): 2.7

EXAMPLE VIII

Example I was substantially repeated with the exception that the following ingredients were charged to the flask:

67.5 grams of p-acetoxybenzoic acid (0.375 mole),
4.5 grams of m-acetoxybenzoic acid (0.025 mole), and
23.0 grams of 6-acetoxy-2-naphthoic acid (0.100 mole).

The resulting wholly aromatic polyester had an I.V. of 4.8 as determined in pentafluorophenol. When the polymer was subjected to differential scanning calorimetry (DSC), it exhibited substantially no crystalline melt transition peak. X-ray analysis suggested that the polymer as prepared was amorphous or non-crystalline, although the polymer melt was thermotropic.

Following melt extrusion the resulting as-spun wholly aromatic polyester fiber exhibited a denier per filament of 15 and the following average single filament properties:

Tenacity (grams per denier): 4.6
Tensile modulus (grams per denier): 367
Elongation (percent): 1.5

Following thermal treatment in a dry nitrogen flow at 275° C. for 17 hours, the fiber exhibited the following average single filament properties:

Tenacity (grams per denier): 9
Tensile modulus (grams per denier): 370
Elongation (percent): 3.0

Although the invention has been described with preferred embodiments it is to be understood that variations and modifications may be employed without departing from the concept of the invention as defined in the following claims.

I claim:

1. A melt processable wholly aromatic polyester capable of forming a thermotropic melt phase at a temperature below approximately 350° C. consisting essentially of the recurring moieties I and II which may include substitution of at least some of the hydrogen atoms present upon an aromatic ring wherein:

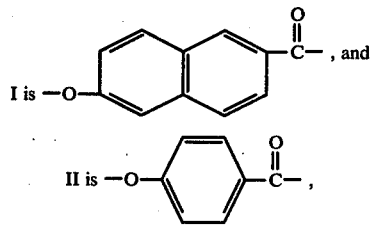

with said optional substitution if present being selected from the group consisting of an alkyl group of 1 to 4 carbon atoms, an alkoxy group of 1 to 4 carbon atoms, halogen, and mixtures of the foregoing, and wherein said polyester comprises approximately 10 to 90 mole percent of moiety I, and approximately 10 to 90 mole percent of moiety II.

2. A melt processable wholly aromatic polyester according to claim 1 which is capable of forming a thermotropic melt phase at a temperature below approximately 325° C.

3. A melt processable wholly aromatic polyester according to claim 1 which is capable of forming a thermotropic melt phase at a temperature below approximately 300° C.

4. A melt processable wholly aromatic polyester according to claim 1 which is capable of undergoing melt processing at a temperature in the range of approximately 280° to 300° C.

5. A melt processable wholly aromatic polyester according to claim 1 which consists essentially of approximately 15 to 35 mole percent of moiety I and approximately 65 to 85 mole percent of moiety II.

6. A melt processable wholly aromatic polyester according to claim 1 which consists essentially of approximately 20 to 30 mole percent of moiety I and approximately 70 to 80 percent of moiety II.

7. A melt processable wholly aromatic polyester according to claim 1 which consists essentially of approximately 65 to 85 mole percent of moiety I and approximately 15 to 35 mole percent of moiety II.

8. A melt processable wholly aromatic polyester according to claim 1 wherein recurring moieties I and II are the sole moieties present.

9. A melt processable wholly aromatic polyester according to claim 1 wherein recurring moieties I and II are free of ring substitution.

10. A melt processable wholly aromatic polyester according to claim 1 which exhibits an inherent viscosity of at least 2.5 when dissolved in a concentration of 0.1 percent by weight in pentafluorophenol at 60° C.

11. A melt processable wholly aromatic polyester according to claim 1 which exhibits an inherent viscosity of at least 3.5 when dissolved in a concentration of 0.1 percent by weight in pentafluorophenol at 60° C.

12. A melt processable wholly aromatic polyester according to claim 1 which exhibits an inherent viscosity of 3.5 to 7.5 when dissolved in a concentration of 0.1 percent by weight in pentafluorophenol at 60° C.

13. A molded article comprising the melt processable wholly aromatic polyester of claim 1.

14. A molding compound comprising the melt processable wholly aromatic polyester of claim 1 which incorporates approximately 1 to 60 percent by weight of a solid filler and/or reinforcing agent.

15. A fiber which has been melt spun from the wholly aromatic polyester of claim 1.

16. A film which has been melt extruded from the wholly aromatic polyester of claim 1.

17. A melt processable wholly aromatic polyester capable of forming a thermotropic melt phase at a temperature below approximately 325° C. consisting essentially of the recurring moieties I and II which may include substitution of at least some of the hydrogen atoms present upon an aromatic ring wherein:

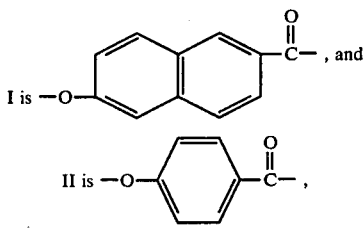

with said optional substitution if present being selected from the group consisting of an alkyl group of 1 to 4 carbon atoms, an alkoxy group of 1 to 4 carbon atoms, halogen, and mixtures of the foregoing, and wherein said polyester comprises approximately 15 to 35 mole percent of moiety I, and approximately 65 to 85 mole percent of moiety II.

18. A melt processable wholly aromatic polyester according to claim 17 which is capable of forming a thermotropic melt phase at a temperature below approximately 300° C.

19. A melt processable wholly aromatic polyester according to claim 17 which is capable of undergoing melt processing at a temperature in the range of approximately 280° to 300° C.

20. A melt processable wholly aromatic polyester according to claim 17 which consists essentially of approximately 20 to 30 mole percent of moiety I and approximately 70 to 80 mole percent of moiety II.

21. A melt processable wholly aromatic polyester according to claim 17 wherein recurring moieties I and II are the sole moieties present.

22. A melt processable wholly aromatic polyester according to claim 17 wherein recurring moieties I and II are free of ring substitution.

23. A melt processable wholly aromatic polyester according to claim 17 which exhibits an inherent viscosity of at least 2.5 when dissolved in a concentration of 0.1 percent by weight in pentafluorophenol at 60° C.

24. A melt processable wholly aromatic polyester according to claim 17 which exhibits an inherent viscosity of at least 3.5 when dissolved in a concentration of 0.1 percent by weight in pentafluorophenol at 60° C.

25. A melt processable wholly aromatic polyester according to claim 17 which exhibits an inherent viscosity of approximately 3.5 to 7.5 when dissolved in a concentration of 0.1 percent by weight in pentafluorophenol at 60° C.

26. A melt processable wholly aromatic polyester according to claim 17 which exhibits a melting point of at least 275° C. as determined by differential scanning calorimetry.

27. A molded article comprising the melt processable wholly aromatic polyester of claim 17.

28. A molding compound comprising the melt processable wholly aromatic polyester of claim 17 which incorporates approximately 1 to 60 percent by weight of a solid filler and/or reinforcing agent.

29. A fiber which has been melt spun from the wholly aromatic polyester of claim 17.

30. A film which has been melt extruded from the wholly aromatic polyester of claim 17.

31. A melt processable wholly aromatic polyester capable of forming a thermotropic melt phase at a temperature below approximately 325° C. consisting of the recurring moieties I and II which are free of ring substitution wherein:

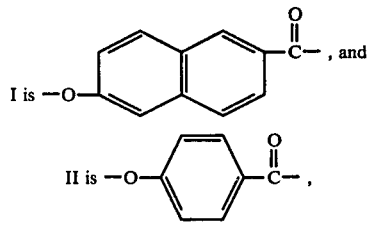

and wherein said polyester comprises approximately 15 to 35 mole percent of moiety I, and approximately 65 to 85 mole percent of moiety II.

32. A melt processable wholly aromatic polyester according to claim 31 which is capable of forming a thermotropic melt phase at a temperature below approximately 300° C.

33. A melt processable wholly aromatic polyester according to claim 31 which exhibits a melting point of at least 275° C. as determined by differential scanning calorimetry.

34. A melt processable wholly aromatic polyester according to claim 31 which consists of approximately 20 to 30 mole percent of moiety I and approximately 70 to 80 mole percent of moiety II.

35. A melt processable wholly aromatic polyester according to claim 31 which consists of approximately 25 mole percent of moiety I and approximately 75 mole percent of moiety II.

36. A melt processable wholly aromatic polyester according to claim 31 which exhibits an inherent viscosity of at least 2.5 when dissolved in a concentration of 0.1 percent by weight in pentafluorophenol at 60° C.

37. A melt processable wholly aromatic polyester according to claim 31 which exhibits an inherent viscosity of at least 3.5 when dissolved in a concentration of 0.1 percent by weight in pentafluorophenol at 60° C.

38. A melt processable wholly aromatic polyester according to claim 31 which exhibits an inherent viscosity of approximately 3.5 to 7.5 when dissolved in a concentration of 0.1 percent by weight in pentafluorophenol at 60° C.

39. A molded article comprising the melt processable wholly aromatic polyester of claim 31.

40. A molding compound comprising the melt processable wholly aromatic polyester of claim 31 which incorporates approximately 1 to 60 percent by weight of a solid filler and/or reinforcing agent.

41. A fiber which has been melt spun from the wholly aromatic polyester of claim 31.

42. A film which has been melt extruded from the wholly aromatic polyester of claim 31.

* * * * *